Sept. 1, 1931.                M. CLAR                1,821,691
                    SIGNAL DEVICE FOR VEHICLES
                       Filed Oct. 12, 1929
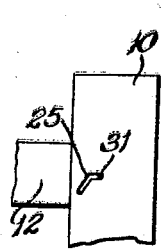
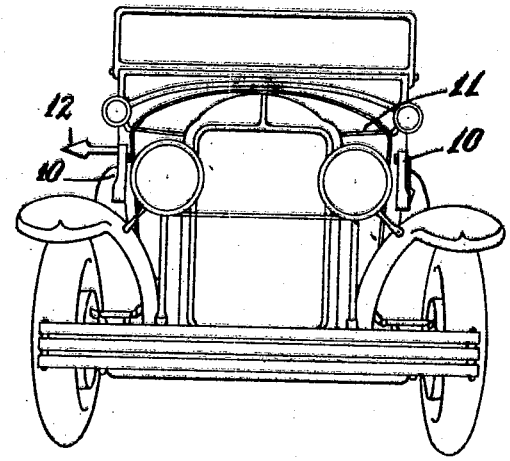
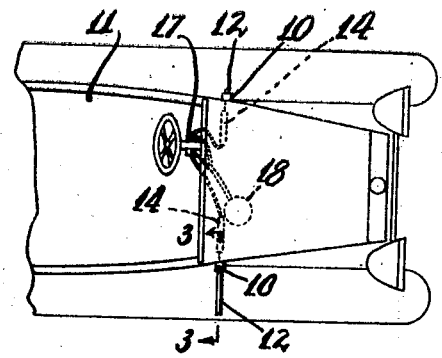
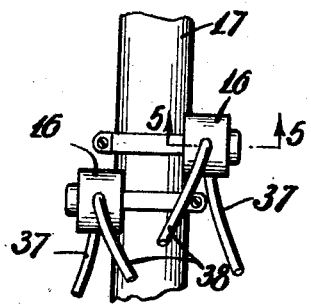
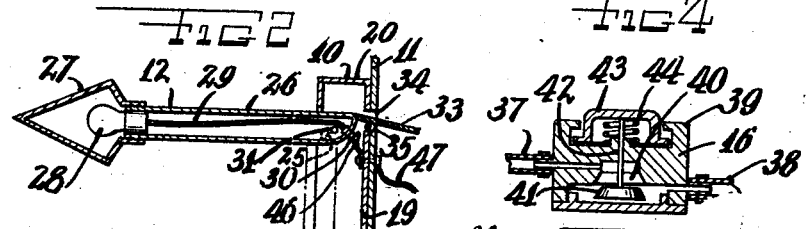
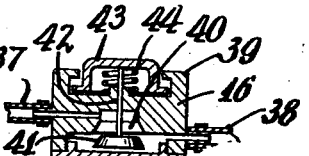
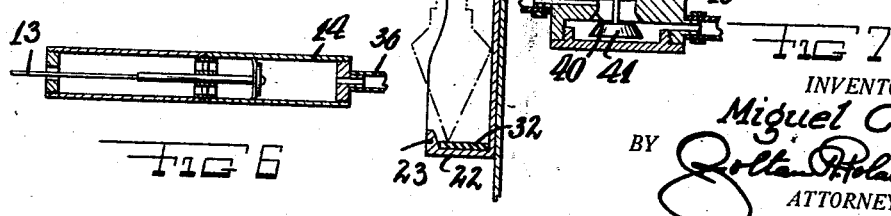
INVENTOR.
Miguel Clar
BY
ATTORNEY Patented Sept. 1, 1931

1,821,691

UNITED STATES PATENT OFFICE

MIGUEL CLAR, OF NEW YORK, N. Y.

SIGNAL DEVICE FOR VEHICLES

Application filed October 12, 1929. Serial No. 399,218.

This invention relates to new and useful improvements in a directional signal for vehicles.

The invention has for an object the provision of a device of the class mentioned which is of simple durable construction, dependable in use and efficient in action, and which can be manufactured and sold at a reasonable cost.

The invention proposes a casing for attachment upon the side of a vehicle, a semaphore pivotally and movably mounted thereon and arranged to normally assume a vertical retracted position latched against swinging, and a cylinder and piston controlled with a push button valve mounted on the steering column of the vehicle and operated by vacuum from the vacuum tank of the vehicle for slightly raising and then extending the semaphore into indicating position.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a perspective view of a vehicle provided with directional signals constructed according to this invention.

Fig. 2 is a fragmentary plan view of Fig. 1.

Fig. 3 is an enlarged fragmentary sectional view taken on the line 3—3 of Fig. 2.

Fig. 4 is a fragmentary enlarged elevational view of a portion of the steering column of the vehicle showing the valves attached.

Fig. 5 is an enlarged sectional detailed view of one of the valves taken on the line 5—5 of Fig. 4.

Fig. 6 is an enlarged detailed sectional view of the piston and cylinder used in the device.

Fig. 7 is a view similar to Fig. 5 but illustrating a modification.

Fig. 8 is a fragmentary enlarged side elevational view of the device showing particularly details in the casing.

The directional signal for vehicles consists of a casing 10 for attachment upon the side of a vehicle such as 11, a semaphore 12 pivotally and movably mounted on the casing and arranged to normally assume a vertical retracted position 13 latched against swinging, and a cylinder 14 with a piston 15 controlled with a push button valve 16 mounted upon the steering column 17 of the vehicle and operated by vacuum from the vacuum tank 18 of the vehicle for slightly raising and extending the semaphore 12 into indicating position as shown in Fig. 3.

The vehicle shown in Figs. 1 and 2 is provided with a directional signal on both sides. The casing 10 is shown attached upon the cowl of the vehicle. The vacuum tank 18 is schematically indicated in the vehicle and the operation of the signal does not depend upon its location or design. Further the signal on the right hand side of Fig. 1 is shown in its vertical retracted position and the left hand signal in its horizontal indicating position.

The said casing 10 consists of a back portion 19, a top portion 20 with a depending front edge 21 and integral with the back portion, a bottom portion 22 with an upward directed front edge 23 and integral with the back portion 19, and side portions 24 also integral with the back portion and formed with slots 25. Each of the slots has a bottom inclined portion and a top horizontal portion as may be seen from an inspection of Fig. 3.

The said semaphore 12 consists of a hollow arm 26 and a hollow pointed front 27 threadedly connected therewith. A lamp 28 is supported within the semaphore for its illumination. A cable 29 extends from the lamp socket to a contact 30 upon the inner end of the arm 26 which is curved as shown in Fig. 3. Trunnions 31 project from the opposite sides of the arm 26 permitting the semaphore to assume a horizontal or a vertical position by reason of engaging within the slots 25. When the semaphore is in its vertical position and the trunnions in the bottom of the slots 25, the pointed head 27 is disposed behind the front edge 23 constituting the said latching means for preventing swinging. A rubber pad 32 is attached upon the top of the casing bottom 22 and serves as a rest for the pointed head 27.

The referred to means for extending the semaphore into horizontal indicating position consists of a flexible member 33 attached on the rear end of the arm 26 and extending thru aperatures 34 in the casing 10 and in the vehicle body. A pulley 35 is rotatively mounted in these apertures and serves to guide the cable. The cable 33 connects with the said piston 15 thru one end of the cylinder 14. The opposite end of the cylinder connects with a flexible hose 36 having its other end connected with the outlet 37 of the button valve 16. The inlet to the button valve is provided with a hose 38 which connects with the vacuum tank 18.

The said button switch 16 consists of a body 39 formed with a valve seat 40. A valve head 41 is arranged for engaging upon the seat and is connected with a stem 42 slidably arranged thru the body and supporting a button 43 on its outer end. A coaxial spring 44 normally urges the button into an extended position. The inlet and outlet of the valve is arranged upon opposite sides of the seat 40. The button 43 is provided with a bottom projecting flange engageable with an inward directed flange of the valve body for preventing complete displacement when the button assumes its outer position.

In Fig. 7 a valve 16' has been shown of slightly modified form. It distinguishes from the valve 16 in that the button 43' is slidably mounted upon the end of the stem 42. In addition the button 43' is provided with a projecting portion 45 engageable in a recess in the body when the button is in its depressed condition and is slightly moved to one side. This latches the valve in an opened position.

The said switch for illuminating the semaphore when in extended position consists of a stationary spring contact 46 mounted on the casing 10 and engageable by the contact 30 when the semaphore is horizontal. The curved inner end of the arm 26 serves as a cam portion for acting against the spring contact 46 and providing the proper contact when the arm is horizontal. A lead 47 connects with the spring contact 46.

For each directional signal upon the vehicle, a control button valve is arranged upon the steering column. For operating any one of the signals, it is merely necessary to depress the button of the button valve so that a passage exists thru the valve. The vacuum from the vacuum tank exhausts the air from the rear of the piston 15 causing the piston to move under atmospheric pressure and drawing upon the cord 33, thus raising the semaphore.

In the horizontal extended position of the semaphore, contacts 30 and 46 engage for illuminating the latter element. Particular attention is called to the slots 25 and the original vertical position 13 of the semaphore. During the initial stages of drawing the cord 33, the trunnions 31 are first moved from the bottom of the slots to the top and then the pointed end 27 of the semaphore is free from the upturned edge 23 of the casing bottom so that upon further drawing of the cord 33 pivoting takes place.

Upon releasing of the button from the button valve, the vacuum is cut and the semaphore slowly assumes its lowered position due to leakage of air into the cylinder 14 and due to the weight of the semaphore itself. Attention is called that during descending of the semaphore, the cord 33 maintains the trunnions in the tops of the slots 25 until the semaphore is in its vertical position and then continued slackening of the cord permits it to drop down into the position indicated by dot and dash lines 13.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In a directional signal for vehicles, a casing for attachment on the side of a vehicle, a semaphore pivotally and movably mounted at one of its ends in the said casing so as to normally fall into a vertical position, a cord for pulling attached above the pivot point for pivoting and extending the semaphore into an extended horizontal indicating position, means for pulling said cord, latching means for preventing the semaphore from swinging when in the said vertical position comprising a portion of said casing in the path of motion of the free end of the semaphore, and means for lifting said semaphore for disengaging the semaphore from said latching means.

2. In a directional signal for vehicles, a casing for attachment on the side of a vehicle, a semaphore pivotally and movably mounted at one of its ends in the said casing so as to normally fall in a vertical position, a cord for pulling attached above the pivot point for pivoting and extending the semaphore into an extended horizontal indicating position, means for pulling said cord, latching means for preventing the semaphore from swinging when in the said vertical position, and means for disengaging the semaphore from said latching means, comprising trunnions mounted in said semaphore and engageable in curved slots formed in the casing so that the semaphore is raised above the latching means when the said cord is drawn.

3. In a directional signal for vehicles, a casing for attachment on the side of a vehicle, a semaphore pivotally and movably mounted at one of its ends in the said casing so as to normally fall in a vertical position, a cord for pulling attached above the pivot point for pivoting and extending the semaphore into an extended horizontal indicating position, means for pulling said cord, latching means for preventing the semaphore from swinging when in the said vertical position, and means for disengaging the semaphore from said latching means, comprising trunnions mounted in said semaphore and engageable in curved slots formed in the casing so that the semaphore is raised above the latching means when the said cord is drawn, said curved slots formed with a bottom inclined portion and a top horizontal portion.

In testimony whereof I have affixed my signature.

MIGUEL CLAR.